(12) United States Patent  
Sugiura et al.

(10) Patent No.: US 7,951,508 B2  
(45) Date of Patent: May 31, 2011

(54) FUEL CELL

(75) Inventors: Seiji Sugiura, Utsunomiya (JP); Shuhei Goto, Utsunomiya (JP); Masahiro Mohri, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1046 days.

(21) Appl. No.: 11/021,327

(22) Filed: Dec. 23, 2004

(65) Prior Publication Data

US 2005/0158599 A1 Jul. 21, 2005

(30) Foreign Application Priority Data

Dec. 25, 2003 (JP) .................................. 2003-429857

(51) Int. Cl.  
*H01M 4/64* (2006.01)
(52) U.S. Cl. ........................................ 429/518; 429/517
(58) Field of Classification Search .................... None  
See application file for complete search history.

(56) References Cited

U.S. PATENT DOCUMENTS

| | | | |
|---|---|---|---|
| 4,416,955 A * | 11/1983 | Chi ................................. | 429/26 |
| 6,099,984 A | 8/2000 | Rock | |
| 6,500,579 B1 | 12/2002 | Maeda et al. | |
| 6,841,282 B2 | 1/2005 | Sugita et al. | |
| 6,872,483 B2 | 3/2005 | Sugiura et al. | |
| 6,921,598 B2 * | 7/2005 | Yamamoto et al. ............. | 429/26 |
| 7,195,837 B2 | 3/2007 | Suzuki et al. | |
| 2003/0049515 A1 * | 3/2003 | Wariishi et al. ................. | 429/38 |
| 2003/0064277 A1 | 4/2003 | Sugiura et al. | |
| 2003/0129475 A1 * | 7/2003 | Enjoji et al. ..................... | 429/38 |
| 2004/0072042 A1 * | 4/2004 | Kim ................................ | 429/23 |

FOREIGN PATENT DOCUMENTS

| | | |
|---|---|---|
| DE | 10300068 A1 | 8/2003 |
| EP | 1135821 B1 | 9/2001 |
| EP | 1135821 B1 | 6/2003 |
| JP | 08-222237 | 8/1996 |
| JP | 11-185778 | 7/1999 |
| JP | 2001-68131 | 3/2001 |
| JP | 2002-075395 | 3/2002 |
| JP | 2002-367665 | 12/2002 |
| JP | 2003-197222 | 7/2003 |
| JP | 2003-338300 | 11/2003 |
| WO | WO 01/67532 | * 9/2001 |

OTHER PUBLICATIONS

German Office Action for Application No. 1913131, dated May 12, 2006.  
Chinese Patent Publication No. CN1311579C issued Apr. 18, 2007 (front page).  
German Office Action for Application No. 102004058923.2, dated May 12, 2006.  
Japanese Office Action for Application No. 2003-429857, dated Sep. 25, 2007.

* cited by examiner

*Primary Examiner* — Cynthia Lee  
(74) *Attorney, Agent, or Firm* — Nelson Mullins Riley & Scarborough LLP; Anthony A. Laurentano

(57) ABSTRACT

A fuel cell is formed by stacking a membrane electrode assembly and separators alternately. Each of the separators includes first and second metal plates. A coolant flow field is formed between the first and second metal plates. The coolant flow field is connected to inlet buffers and outlet buffers. Protrusions for limiting the flow of a coolant are provided at the inlet buffers and the outlet buffers on upper and lower opposite end positions of the coolant flow field.

7 Claims, 18 Drawing Sheets

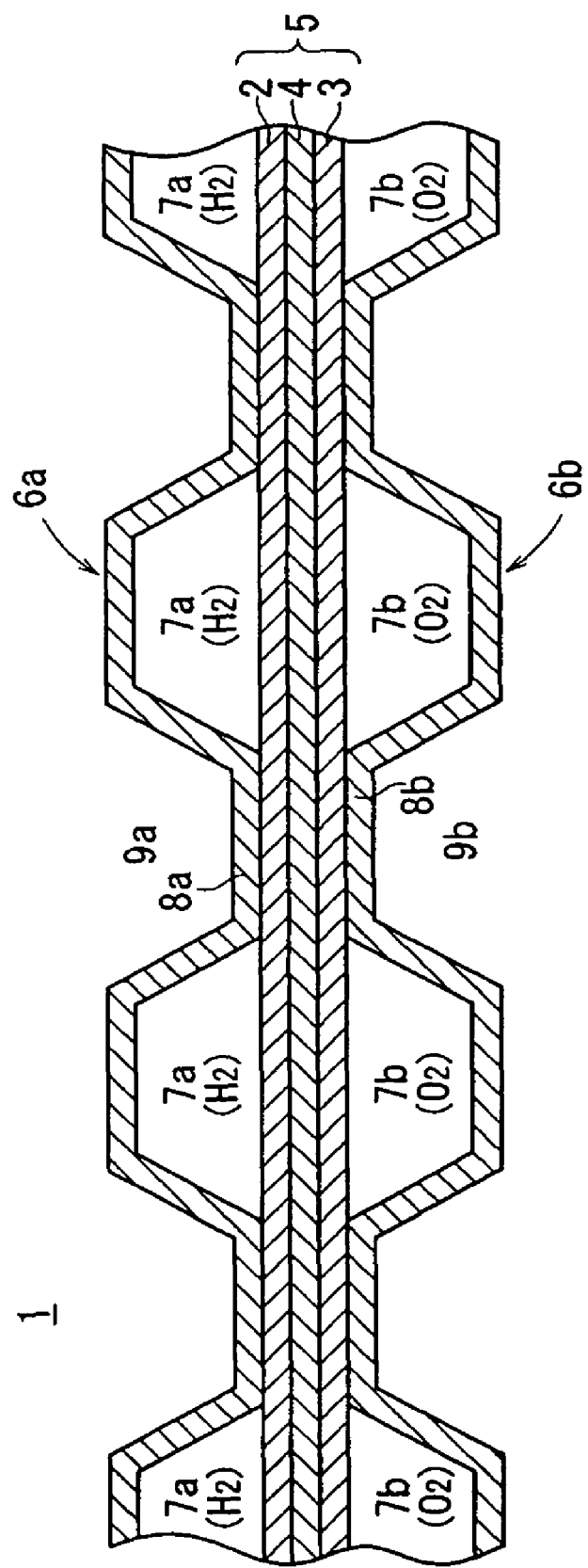

FUEL CELL

BACKGROUND OF THE INVENTION

1. Field of the Invention

The present invention relates to a fuel cell formed by stacking an electrolyte electrode assembly and separators alternately. The electrolyte electrode assembly includes an anode, a cathode, and an electrolyte interposed between the anode and the cathode.

2. Description of the Related Art

For example, a solid polymer fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas (reactant gas) such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electrical energy. An oxidizing gas (reactant gas) such as a gas chiefly containing oxygen (hereinafter also referred to as the oxygen-containing gas) is supplied to the cathode. At the cathode, the hydrogen ions from the anode combine with the electrons and oxygen to produce water.

In the fuel cell, a fuel gas flow field is formed on the separator facing the anode for supplying the fuel gas to the anode. An oxygen-containing gas flow field is formed on the separator facing the cathode for supplying the oxygen-containing gas to the cathode. Further, a coolant flow field is provided between the anode side separator and the cathode side separator such that a coolant flows along the surfaces of the separators.

Normally, the separators of this type are formed of carbon material. However, it has been found that it is not possible to produce a thin separator using the carbon material due to factors such as the strength. Therefore, recently, attempts to reduce the overall size and weight of the fuel cell using a separator formed of a thin metal plate (hereinafter also referred as the metal separator) have been made. In comparison with the carbon separator, the metal separator has the higher strength, and it is possible to produce a thin metal separator easily. The desired reactant flow field can be formed on the metal separator by pressure forming to achieve the reduction in thickness of the metal separator.

For example, a fuel cell 1 shown in FIG. 18 includes a membrane electrode assembly 5 and a pair of metal separators 6a, 6b sandwiching the membrane electrode assembly 5. The membrane electrode assembly 5 includes an anode 2, a cathode 3, and an electrolyte membrane 4 interposed between the anode 2 and the cathode 3.

The metal separator 6a has a fuel gas flow field 7a for supplying a fuel gas such as a hydrogen-containing gas on its surface facing the anode 2. The metal separator 6b has an oxygen-containing gas flow field 7b for supplying an oxygen-containing gas such as the air on its surface facing the cathode 3. The metal separators 6a, 6b have planar regions 8a, 8b in contact with the anode 2 and the cathode 3. Further, coolant flow fields 9a, 9b as passages of a coolant is formed on back surfaces (surfaces opposite to the contact surfaces) of the planar regions 8a, 8b.

However, in the metal separators 6a, 6b, the shapes of the coolant flow fields 9a, 9b are determined inevitably based on the shapes of the fuel gas flow field 7a and the oxygen-containing gas flow field 7b. In particular, in an attempt to achieve the long grooves, assuming that the fuel gas flow field 7a and the oxygen-containing gas flow field 7b comprise serpentine flow grooves, the shapes of the coolant flow fields 9a, 9b are significantly constrained. Therefore, the flow rate of the coolant in the electrode surface is not uniform.

Thus, the coolant is stagnant in some area of the coolant flow fields 9a, 9b of the metal separator 6a, 6b, and the coolant may not flow uniformly over the entire surfaces of the metal separators 6a, 6b. Therefore, it is difficult to cool the electrode surfaces uniformly to obtain the stable power generation performance.

In view of the above, for example, Japanese Laid-Open Patent Publication 2002-75395 discloses a separator of a fuel cell. The separator is a metal separator, and includes two corrugated metal plates having gas flow fields, and a corrugated metal intermediate plate sandwiched between the two metal plates. The metal intermediate plate has coolant water flow fields on both surfaces.

However, according to the conventional technique, the metal separator has three metal plates including the two metal plates having gas flow fields, and the one intermediate metal plate having the coolant flow fields on its both surfaces. Therefore, in particular, when a large number of metal separators are stacked to form the fuel cell stack, the number of components of the fuel cell stack is large to increase the production cost, and the dimension in the stacking direction of the metal separators is large. Thus, the overall size of the fuel cell stack is large.

SUMMARY OF THE INVENTION

A main of the present invention is to provide a fuel cell having a simple structure in which the coolant flows uniformly along a surface of a separator, and it is possible to achieve the desired power generation performance.

According to the present invention, a fuel cell is formed by stacking an electrolyte electrode assembly and separators alternately in a stacking direction. The electrolyte electrode assembly includes an anode and a cathode and an electrolyte interposed between the anode and the cathode. A reactant gas passage and a coolant passage extend through the fuel cell in the stacking direction.

Each of the separators at least includes first and second metal plates stacked together. The first metal plate has an oxygen-containing gas flow field including a curved flow passage for supplying an oxygen-containing gas along an electrode surface of the cathode, and the second metal plate has a fuel gas flow field including a curved flow passage for supplying a fuel gas along an electrode surface of the anode.

A coolant flow field is formed between the first and second metal plates for supplying the coolant along surfaces of the separator. At least two buffers separated from the coolant passage in at least two directions, and connected to the coolant flow field. A protrusion is provided on a side of at least one of the buffers away from the coolant passage for limiting the flow of the coolant.

In general, the first and second metal plates have an oxygen-containing gas flow field and a fuel gas flow field. Each of the oxygen-containing gas flow field and the fuel gas flow field comprises has a curved flow passage such as a serpentine flow passage. The coolant flow field is formed between the first and second metal plates. Therefore, the flow condition of the coolant in the coolant flow field is not uniform.

Specifically, overlapping portions where flow grooves are overlapped with each other, and intersecting portions where flow grooves intersect with each other are present between the first and second metal plates. In the overlapping portion, the depth of the flow groove is large, and thus, the flow field resistance is small. In the intersecting portion, the depth of the flow groove is small, and thus, the flow field resistance is large. In the coolant flow field, the overlapping portions are long at opposite end positions in comparison with the overlapping portions at the middle position, and the coolant flows easily at the opposite end positions.

In order to address the problem, the protrusion for limiting the flow of the coolant is provided on the side of the buffer away from the coolant passage, at a position where the coolant flows easily.

Preferably, the reactant gas passage comprises a fuel gas supply passage, an oxygen-containing gas supply passage, a fuel gas discharge passage, and an oxygen-containing gas discharge passage. The coolant passage comprises a coolant supply passage and a coolant discharge passage. The buffers include at least two inlet buffers separated from the coolant supply passage in at least two directions, and connected to the coolant flow field, and include at least two outlet buffers separated from the coolant discharge passage in at least two directions, and connected to the coolant flow field.

Further, preferably, a first inlet buffer connected to the coolant supply passage and a first outlet buffer connected to the coolant discharge passage are formed on the first metal plate. A second inlet buffer connected to the coolant supply passage and a second outlet buffer connected to the coolant discharge passage are formed on the second metal plate at positions different from positions of the first inlet buffer and the first outlet buffer.

Further, preferably, among six passages comprising the fuel gas supply passage, the oxygen-containing gas supply passage, the coolant supply passage, the fuel gas discharge passage, the oxygen-containing gas discharge passage, and the coolant discharge passage, three passages extend through one end of the separators, and the other three passages extend through the other end of the separators. The coolant supply passage and the coolant discharge passage are provided at middle positions of the opposite ends of the separators.

According to the present invention, the protrusion is provided at the position where the coolant flows easily. At the position, the flow of the coolant is limited. Thus, it is possible to achieve the uniform flow of the coolant over the coolant flow field. With the simple structure, the coolant flows uniformly along a surface of a separator, and it is possible to achieve the desired power generation performance.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 18 is a cross sectional view showing a fuel cell formed by sandwiching a membrane electrode assembly between a pair of metal separators.

DESCRIPTION OF THE PREFERRED EMBODIMENTS

Figure 1:
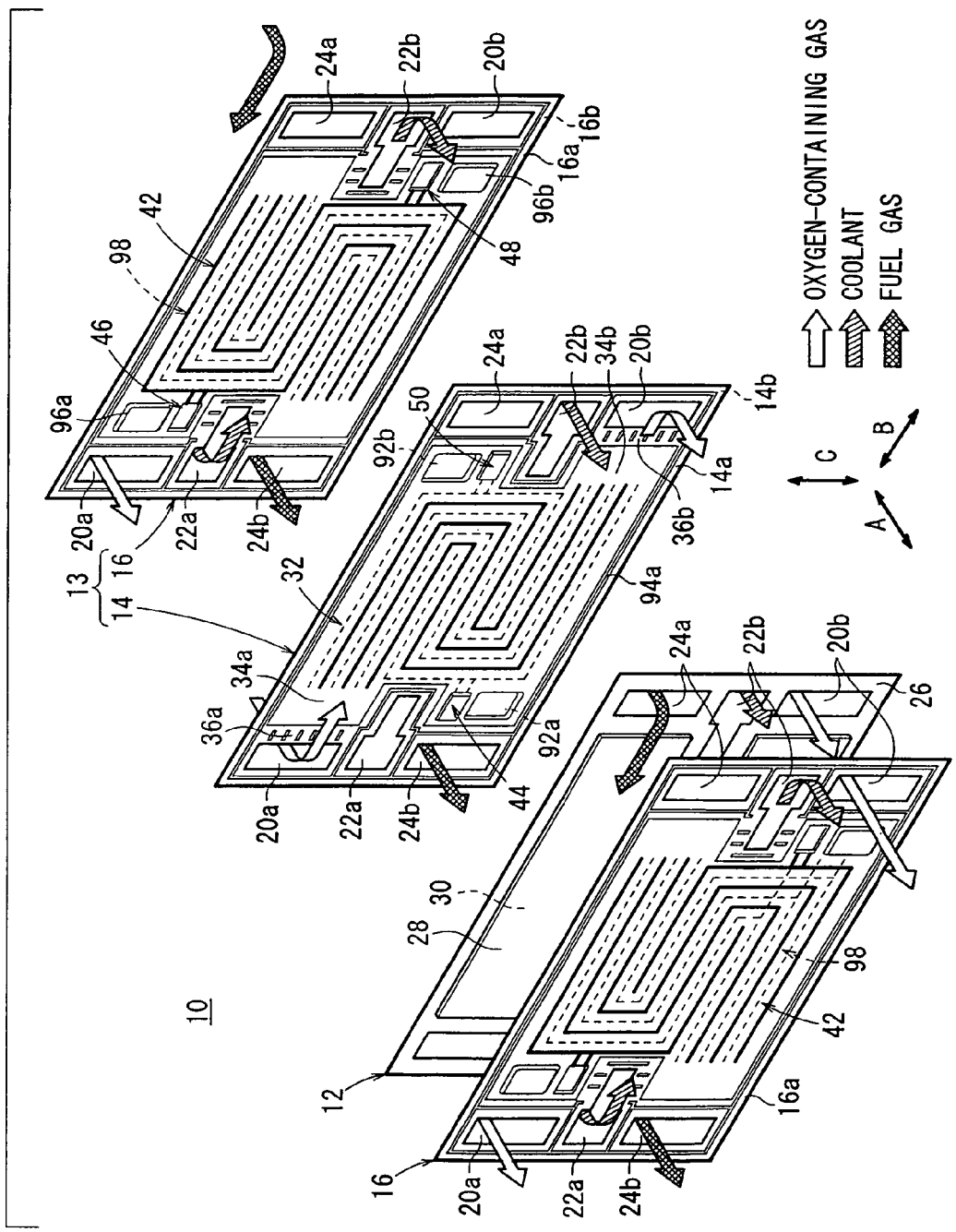
FIG. 1 is an exploded perspective view showing main components of a fuel cell according to a first embodiment of the present invention.
Figure 2:
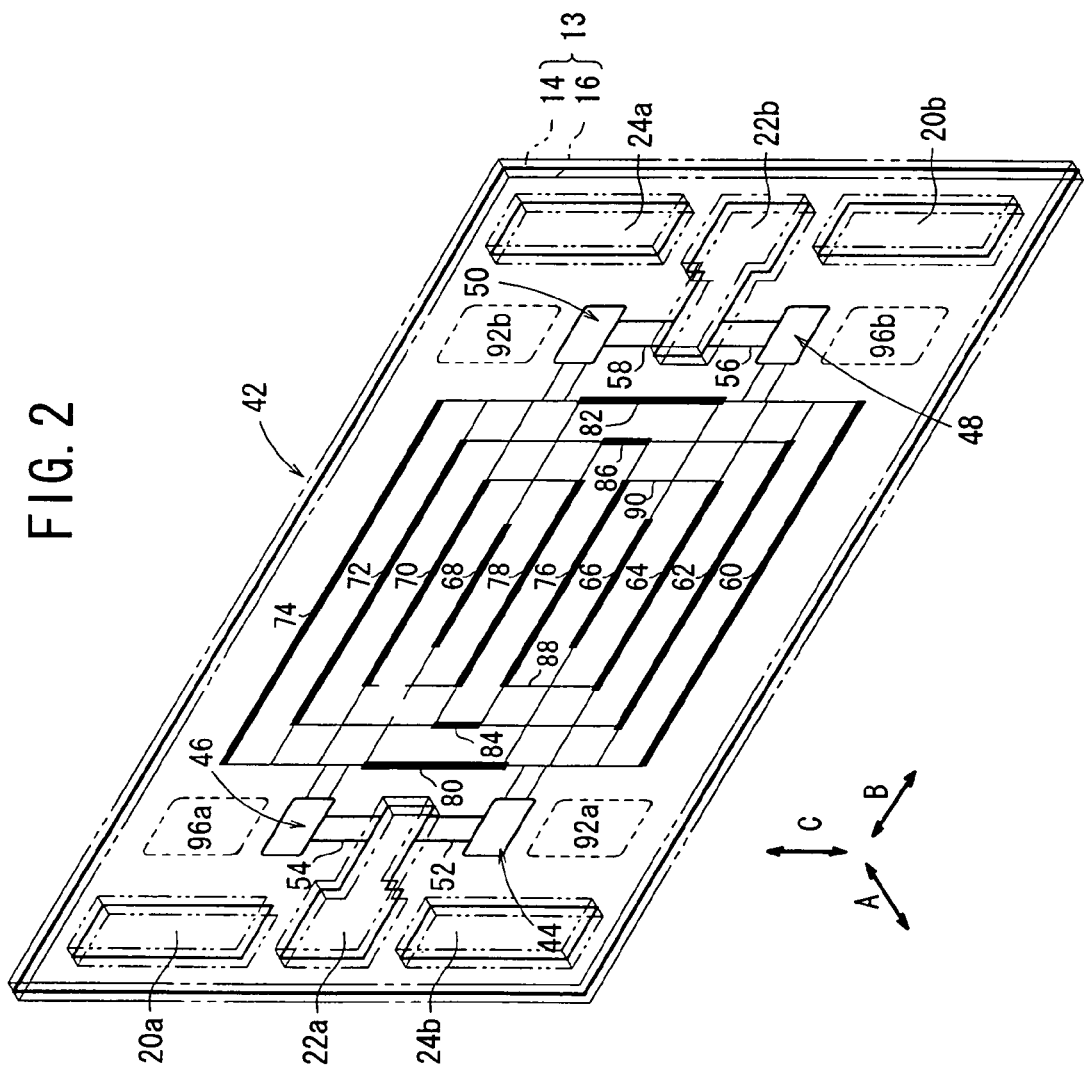
FIG. 2 is a perspective view showing a coolant flow field of the fuel cell.
Figure 3:
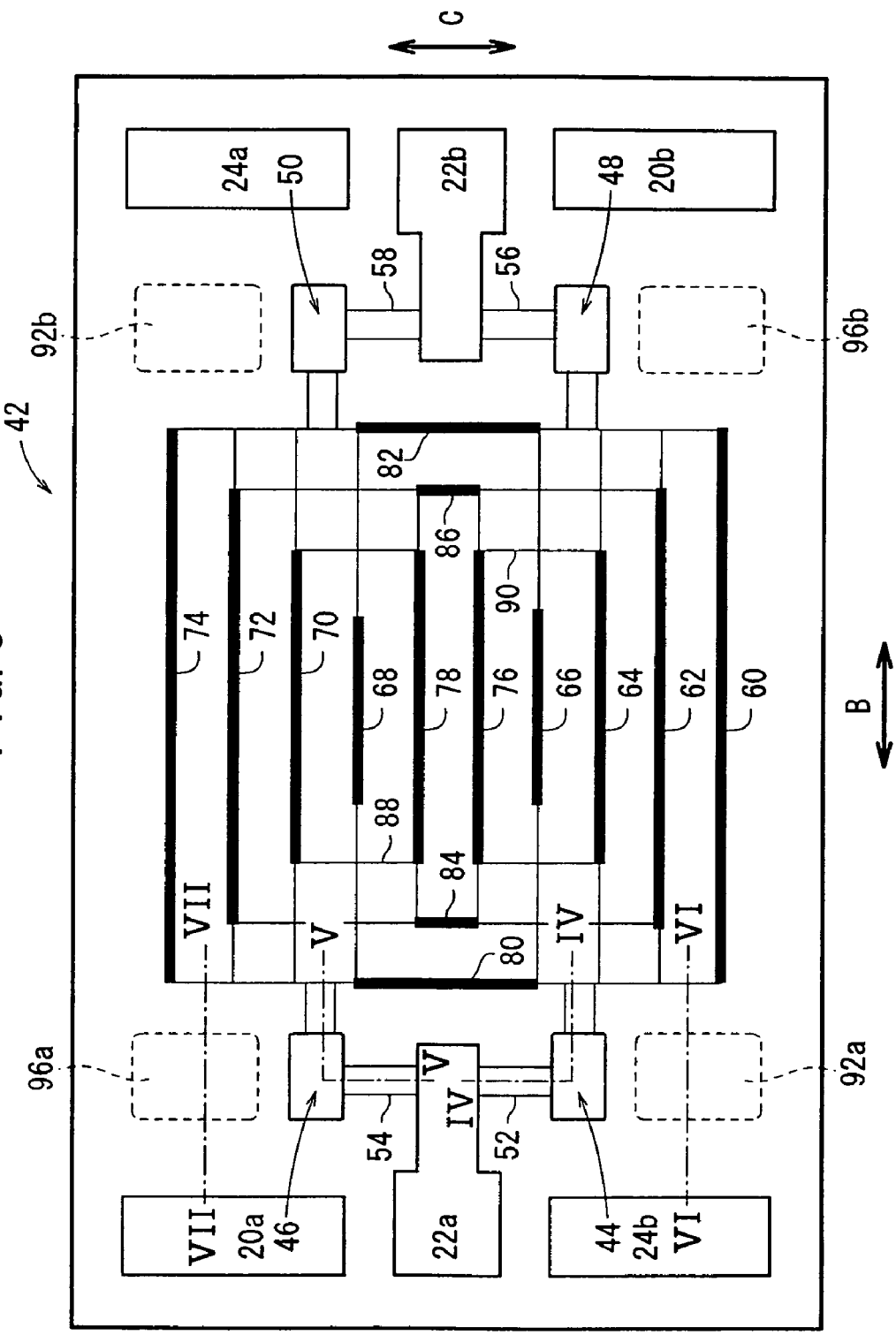
FIG. 3 is a front view showing the coolant flow field.
Figure 4:
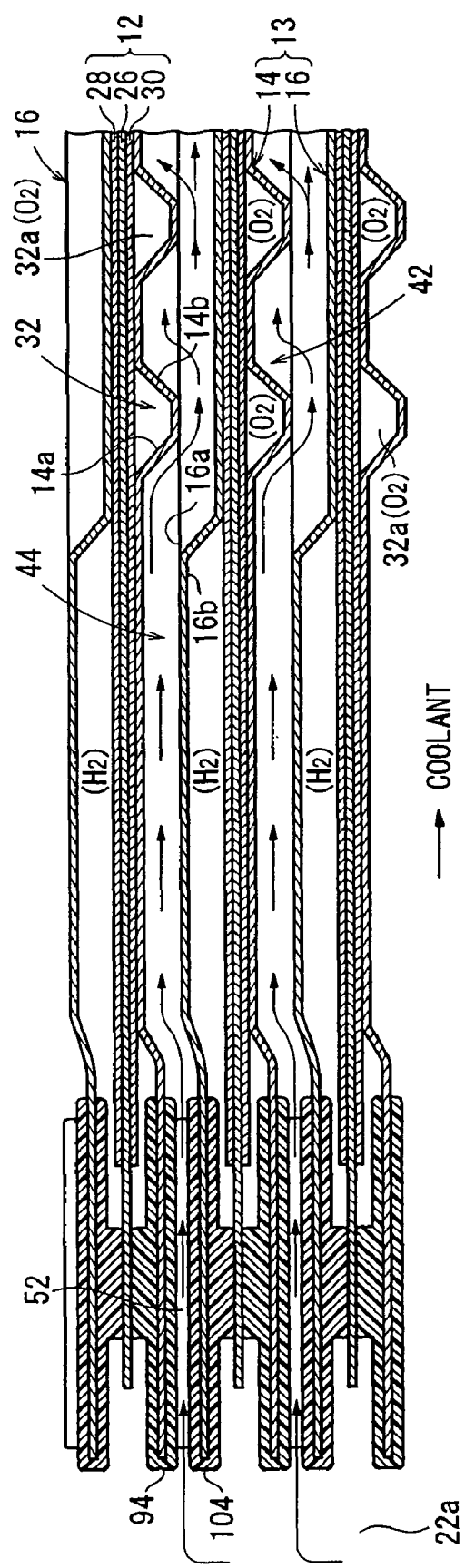
FIG. 4 is a cross sectional view showing the fuel cell taken along a line IV-IV in FIG. 3.
Figure 5:
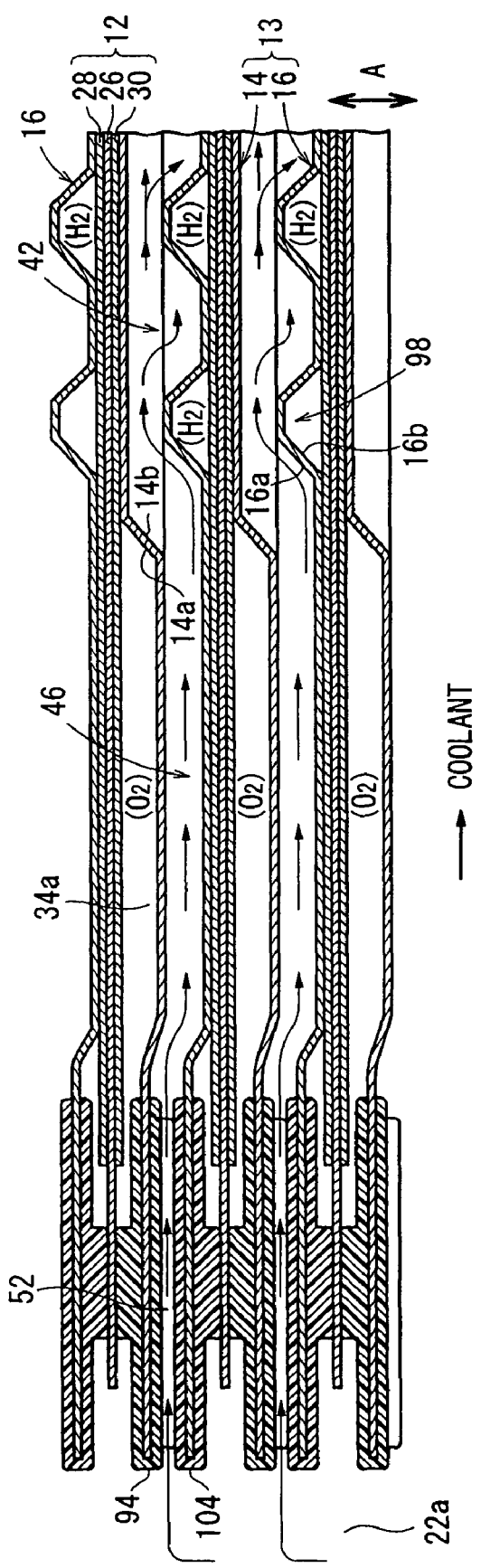
FIG. 5 is a cross sectional view showing the fuel cell taken along a line V-V in FIG. 3.

FIG. 1 is an exploded perspective view showing main components of a fuel cell 10 according to a first embodiment of the present invention. FIG. 2 is a perspective view showing a coolant flow field (described later) 42 of the fuel cell. FIG. 3 is a front view showing the coolant flow field 42.

The fuel cell 10 is formed by stacking a membrane electrode assembly 12 and separators 13 alternately. Each of the separators 13 includes first and second metal plates 14, 16 which are stacked together (see FIGS. 1, and 4 through 7).

As shown in FIG. 1, at one end of the fuel cell 10 in a horizontal direction indicated by an arrow B, an oxygen-containing gas supply passage 20a for supplying an oxygen-containing gas, a coolant supply passage 22a for supplying a coolant, and a fuel gas discharge passage 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in the stacking direction indicated by an arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example.

Middle positions at opposite ends of the anode 28 and the cathode 30 in the direction indicated by the arrow B are cut away to provide the coolant supply passage 22a and the coolant discharge passage 22b.

Each of the anode 28 and the cathode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 30 and the electrode catalyst layer of the anode 28 are formed on both surfaces of the solid polymer electrolyte membrane 26, respectively.

Figure 8:
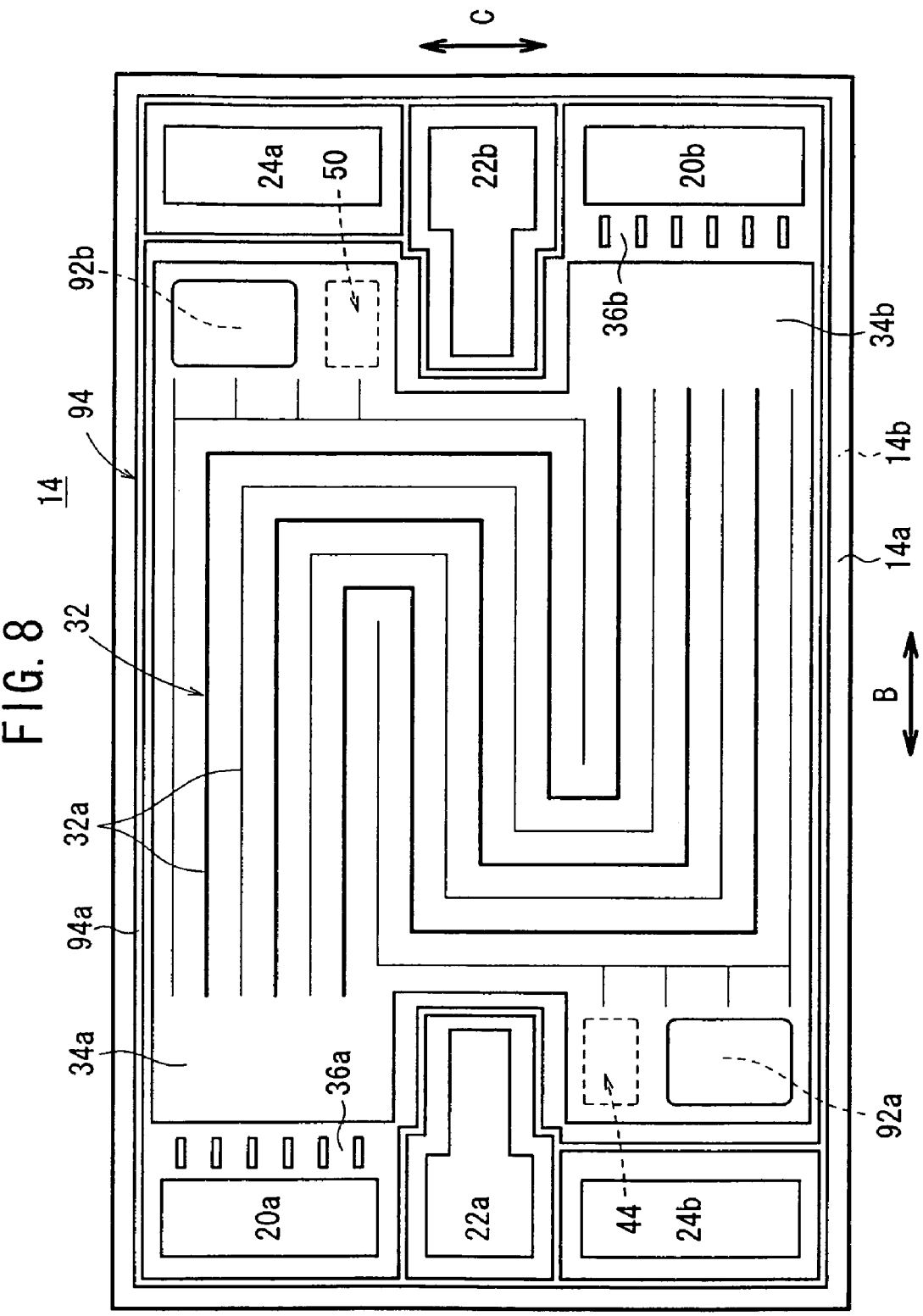
FIG. 8 is a view showing one surface of a first metal plate of the fuel cell.

As shown in FIGS. 1 and 8, the first metal plate 14 has an oxygen-containing gas flow field 32 on its surface 14a facing the membrane electrode assembly 12. The oxygen-containing gas flow field 32 is connected to the oxygen-containing gas supply passage 20a and the oxygen-containing gas discharge passage 20b. The oxygen-containing gas flow field 32 is connected to an inlet buffer 34a near the oxygen-containing gas supply passage 20a, and connected to an outlet buffer 34b near the oxygen-containing gas discharge passage 20b. The inlet buffer 34a is connected to the oxygen-containing gas supply passage 20a through connection grooves 36a, and the outlet buffer 34b is connected to the oxygen-containing gas discharge passage 20b through connection grooves 36b.

The inlet buffer 34a and the outlet buffer 34b are connected through a plurality of oxygen-containing gas flow grooves 32a of the oxygen-containing gas flow field 32. The oxygen-containing gas flow grooves 32a have a serpentine pattern for allowing the oxygen-containing gas to flow back and forth in the direction indicated by the arrow B, and move in the direction indicated by the arrow C. The oxygen-containing gas flow grooves 32a are serpentine grooves including two turn regions and three straight regions in the direction indicated by the arrow B.

A surface 14b of the first metal plate 14 and a surface 16a of the second metal plate 16 face each other. When the first metal plate 14 and the second metal plate 16 are stacked together, the coolant flow field 42 is formed between the surface 14b and the surface 16a. As shown in FIGS. 2 and 3, the coolant flow field 42 includes, e.g., two inlet buffers 44, 46 near opposite ends of the coolant supply passage 22a in the direction indicated by the arrow C, and includes, e.g., two outlet buffers 48, 50 near opposite ends of the coolant discharge passage 22b in the direction indicated by the arrow C.

The coolant supply passage 22a and the inlet buffers 44, 46 are connected by two inlet flow grooves 52, 54, respectively, and the coolant discharge passage 22b and the outlet buffers 48, 50 are connected by two outlet flow grooves 56, 58, respectively.

The coolant flow field 42 includes straight long flow grooves 60, 62, 64, and 66 extending in the direction indicated by the arrow B at lower positions, and straight long flow grooves 68, 70, 72, and 74 extending in the direction indicated by the arrow B at upper positions. Further, straight flow grooves 76, 78 extending in the direction indicated by the arrow B for a predetermined distance are provided between the straight flow groove 66 and the straight flow groove 68.

The straight flow grooves 60 through 74 are connected by straight flow grooves 80, 82 which are extending in the direction indicated by the arrow C. The straight flow grooves 62 through 72, 76 and 78 are connected with each other by straight flow grooves 84, 86 which are extending in the direction indicated by the arrow C. The straight flow grooves 64, 66, and 76 and the straight flow grooves 68, 70, and 78 are connected with each other by straight flow grooves 88, 90 which are extending discontinuously in the direction indicated by the arrow C, respectively.

The coolant flow field 42 is partially defined by the first metal plate 14, and partially defined by the second metal plate 16. The coolant flow field 42 is formed between the first metal plate 14 and the second metal plate 16 when the first metal plate 14 and the second metal plate 16 are stacked together.

Figure 9:
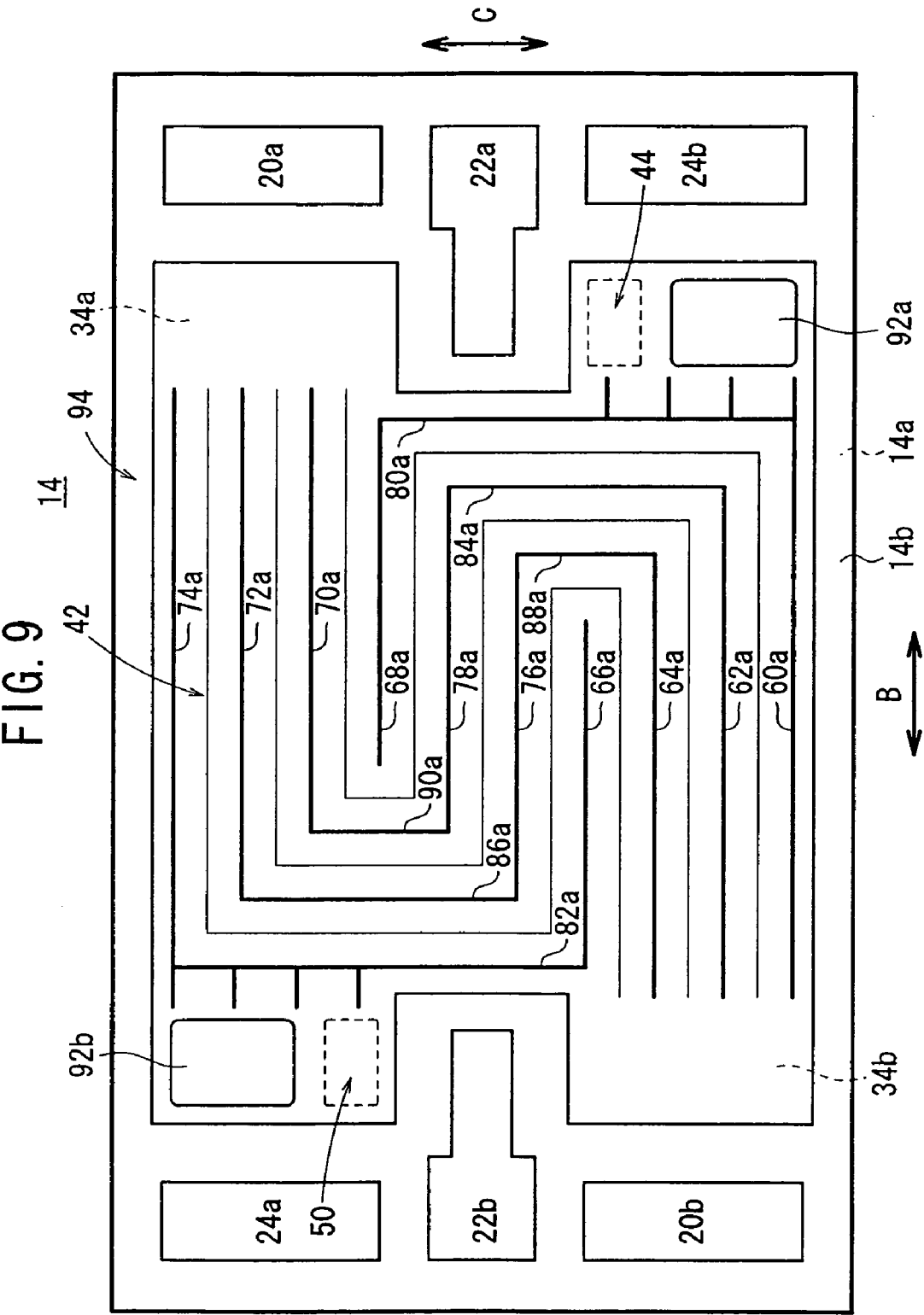
FIG. 9 is a view showing the other surface of the first metal plate.

As shown in FIG. 9, part of the coolant flow field 42 is formed on the surface 14b of the first metal separator 14. Ridges on the surface 14b of the first metal plate 14 formed by the grooves of the oxygen-containing gas flow field 32 on the surface 14a of the first metal plate 14 are not shown for ease of understanding. Likewise, in FIG. 10, ridges on the surface 16b of the second metal plate 16 formed by the grooves of the fuel gas flow field 98 on the surface 16a of the second metal plate 16 are not shown.

An inlet buffer 44 connected to the coolant supply passage 22a and an outlet buffer 50 connected to the coolant discharge passage 22b are provided on the surface 14b. On the surface 14b, grooves 60a through 78a as part of straight flow grooves 60 through 78 extend in the direction indicated by the arrow B for predetermined distances, and grooves 80a through 90a as part of straight flow grooves 80 through 90 extend in the direction indicated by the arrow C for predetermined distances.

Figure 6:
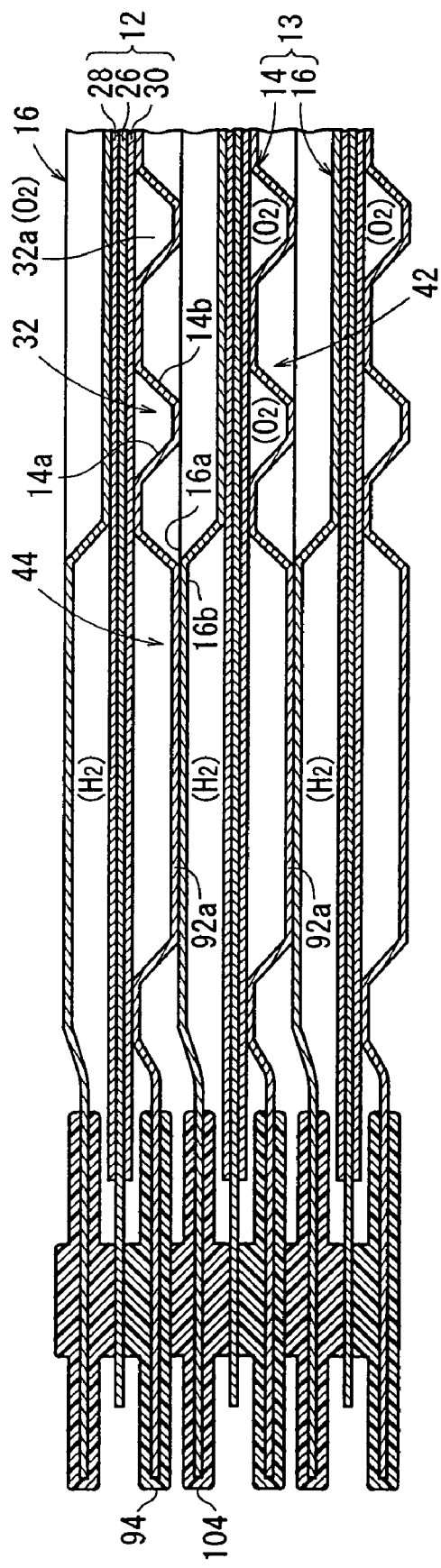
FIG. 6 is a cross sectional view showing the fuel cell taken along a line VI-VI in FIG. 3.

A protrusion 92a for limiting the flow of the coolant is provided on a side of the inlet buffer 44 away from the coolant supply passage 22a, i.e., at a lower end position of the coolant flow field 42 (see FIGS. 6 and 9). Further, a protrusion 92b for limiting the flow of the coolant is provided on a side of the outlet buffer 50 away from the coolant discharge passage 22b, i.e., at an upper end position of the coolant flow field 42. The protrusions 92a, 92b are formed integrally on the first metal plate 14 by pressure forming, and form recesses on the surface 14a. The recesses function as closure structures for preventing entry of the oxygen-containing gas.

A first seal member 94 is formed integrally on the surfaces 14a, 14b of the first metal plate 14 by injection molding to cover (sandwich) the outer edge of the first metal plate 14. The first seal member 94 is a planar seal including a line seal 94a as shown in FIG. 8. The line seal 94a is formed around the oxygen-containing gas supply passage 20a, the oxygen-containing gas discharge passage 20b, and the oxygen-containing gas flow field 32 for preventing leakage of the oxygen-containing gas. The line seal 94a includes divider walls of the connection grooves 36a, 36b.

Figure 10:
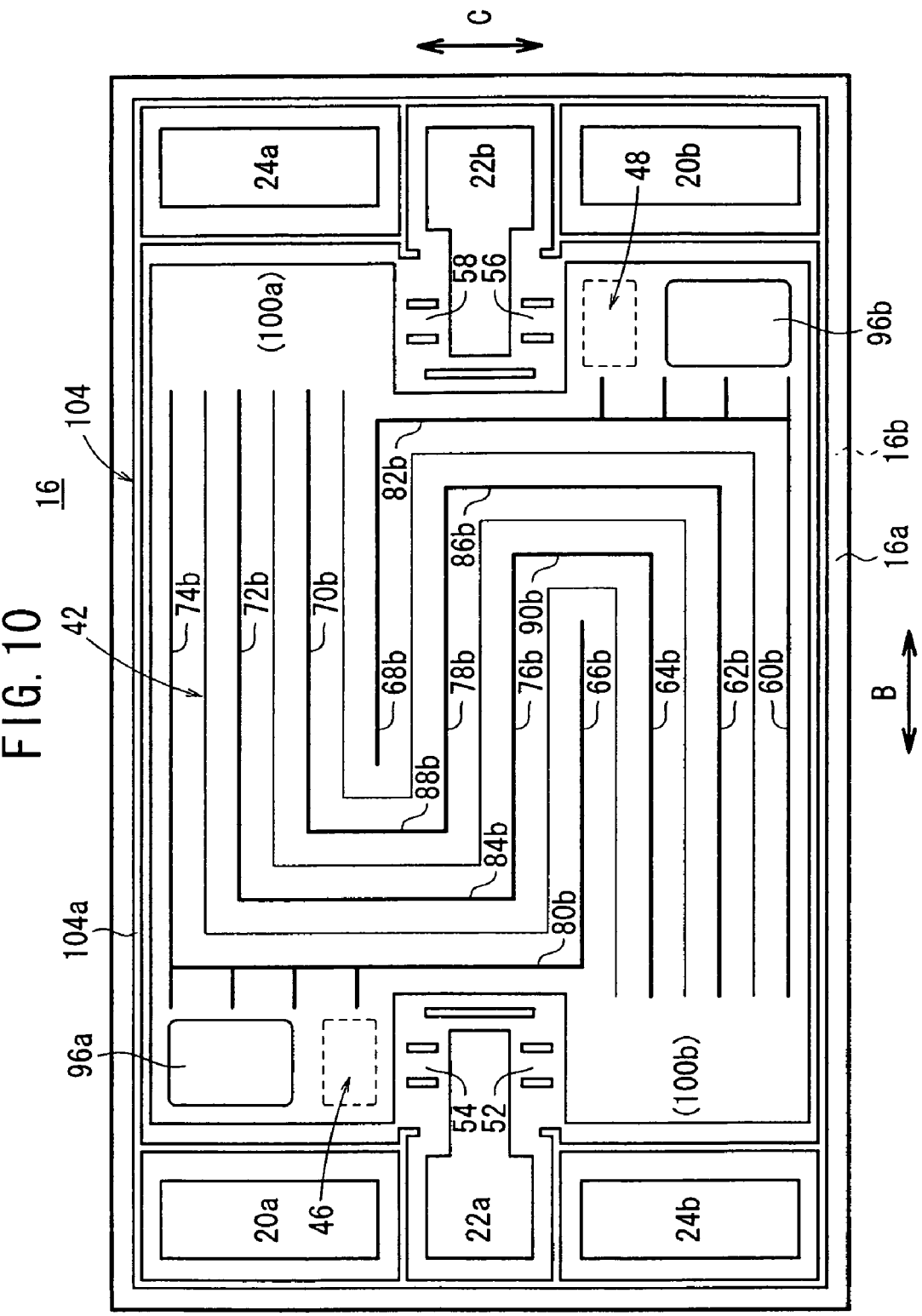
FIG. 10 is a view showing one surface of a second metal plate of a fuel cell.

As shown in FIG. 10, an inlet buffer 46 and an outlet buffer 48 are formed on the surface 16a of the second metal plate 16. On the surface 16a, grooves 60b through 78b as part of straight flow grooves 60 through 78 extend in the direction indicated by the arrow B for predetermined distances, and grooves 80b through 90b as part of straight flow grooves 80 through 90 extend in the direction indicated by the arrow C for predetermined distances.

In the coolant flow field 42, at part of the straight flow grooves 60 through 78 extending in the direction indicated by the arrow B, the grooves 60a through 78a and the grooves 60b through 78b face each other to form a main flow field. The sectional area of the main flow field in the coolant flow field 42 is twice as large as the sectional area of the other part of the coolant flow field 42 (see FIGS. 2 and 3). The straight flow grooves 80 through 90 are partially defined by grooves on both surfaces 14b, 16a of the first and second metal plates 14, 16, partially defined on one surface 14b of the first metal plate 14, and partially defined on one surface 16a of the second metal plate 16.

Figure 11:
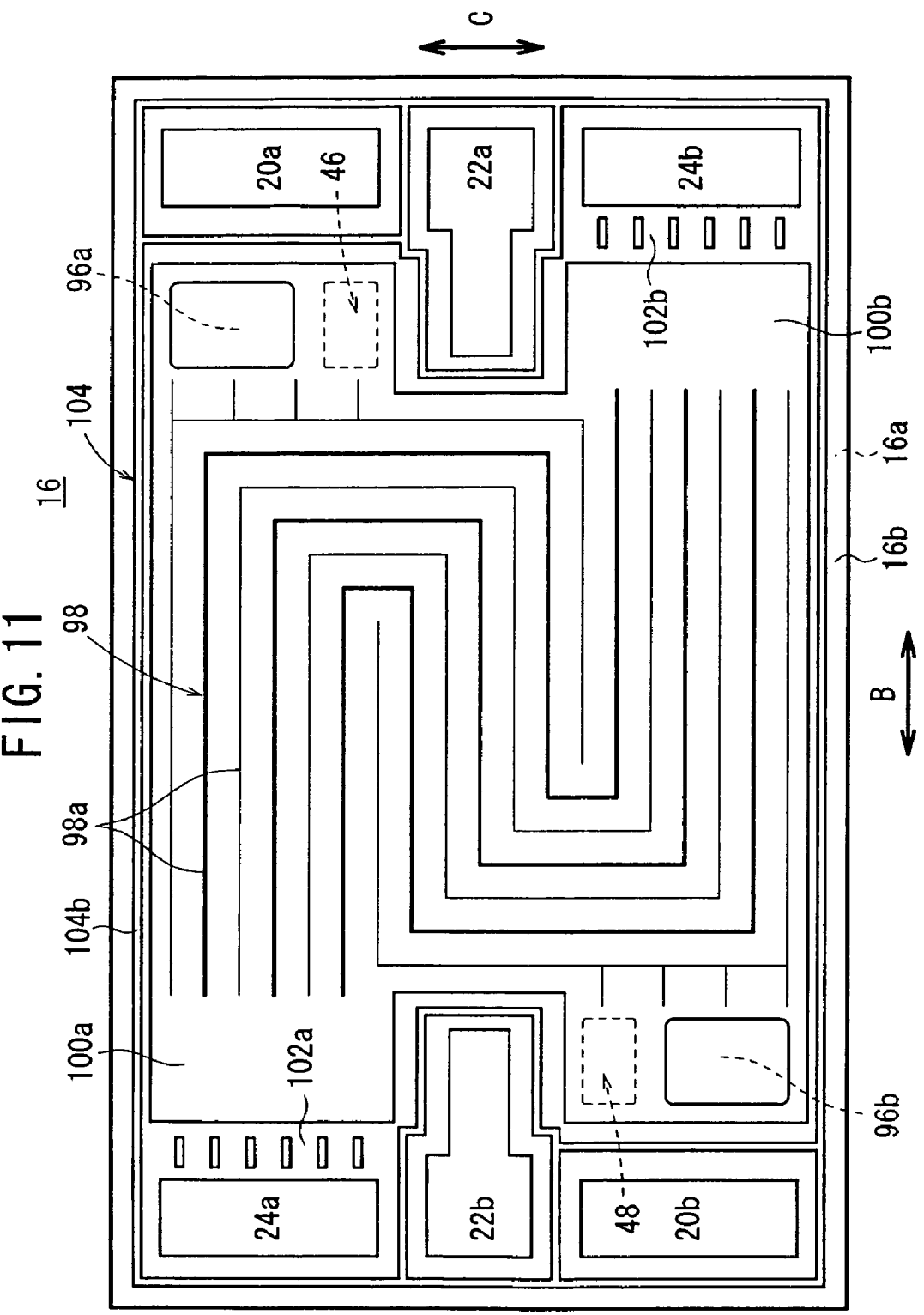
FIG. 11 is a view showing the other surface of the second metal plate.

As shown in FIG. 10, a protrusion 96a for limiting the flow of the coolant is provided on a side of the inlet buffer 46 away from the coolant supply passage 22a, i.e., at an upper end position of the coolant flow field 42. Further, a protrusion 96b for limiting the flow of the coolant is provided on a side of the outlet buffer 48 away from the coolant discharge passage 22b, i.e., at a lower end position of the coolant flow field 42. As shown in FIG. 11, the protrusions 96a, 96b form recesses on the surface 16b. The recesses function as closure structures for preventing entry of the fuel gas.

The second metal plate 16 has a fuel gas flow field 98 on its surface 16b facing the membrane electrode assembly 12. The fuel gas flow field 98 is connected to an inlet buffer 100a near the fuel gas supply passage 24a and connected to an outlet buffer 100b near the fuel gas discharge passage 24b.

The inlet buffer 100a is connected to the fuel gas supply passage 24a through a plurality of connection grooves 102a, and the outlet buffer 100b is connected to the fuel gas discharge passages 24b through a plurality of connection grooves 102b. The fuel gas flow field 98 comprises a plurality of fuel gas flow grooves 98a having a serpentine pattern for allowing the fuel gas to flow back and forth in the direction indicated by the arrow B, and move in the direction indicated by the arrow C. The fuel gas flow grooves 98a are serpentine grooves including two turn regions and three straight regions.

A second seal member 104 is formed integrally on the surfaces 16a, 16b of the second metal plate 16 by injection molding to cover (sandwich) the outer edge of the second metal plate 16. The second seal member 104 is a planar seal including a line seal 104a as shown in FIG. 10 and a line seal 104b as shown in FIG. 11. The line seal 104a is formed around the coolant supply passage 22a, the coolant discharge passage 22b, and the coolant flow field 42 for preventing leakage of the coolant. The line seal 104b is formed around the fuel gas supply passage 24a, the fuel gas discharge passage 24b, and the fuel gas flow field 98 for preventing leakage of the fuel gas.

The line seal 104a includes divider walls of inlet flow grooves 52, 54, divider walls of outlet flow grooves 56, 58 (see FIG. 10). The line seal 104b includes divider walls of connection grooves 102a, 102b (see FIG. 11).

Operation of the fuel cell 10 according to the first embodiment will be described below.

As shown in FIG. 1, an oxygen-containing gas is supplied to the oxygen-containing gas supply passage 20a, a fuel gas such as a hydrogen-containing gas is supplied to the fuel gas supply passage 24a, and a coolant such as pure water, an ethylene glycol or an oil is supplied to the coolant supply passage 22a.

The oxygen-containing gas flows from the oxygen-containing gas supply passage 20a into the oxygen-containing gas flow field 32 of the first metal plate 14. As shown in FIG. 8, the oxygen-containing gas flows through the inlet buffer 34a, and is distributed into the oxygen-containing gas flow grooves 32a. The oxygen-containing gas flows through the oxygen-containing gas flow grooves 32a in a serpentine pattern along the cathode 30 of the membrane electrode assembly 12.

The fuel gas flows from the fuel gas supply passage 24a into the fuel gas flow field 98 of the second metal plate 16. As shown in FIG. 11, the fuel gas flows through the inlet buffer 100a, and is distributed into the fuel gas flow grooves 98a. The fuel gas flows through the fuel gas flow grooves 98a in a serpentine pattern along the anode 28 of the membrane electrode assembly 12.

Thus, in the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 34b (see FIG. 8). Likewise, after the fuel gas is consumed at the anode 28, the fuel gas flows into the fuel gas discharge passage 24b through the outlet buffer 100b (see FIG. 11).

The coolant supplied to the coolant supply passages 22a flows into the coolant flow field 42 between the first and second metal plates 14, 16. As shown in FIGS. 2 through 5, the coolant from the coolant supply passage 22a flows through the inlet flow grooves 52, 54 in the direction indicated by the arrow C, and flows into the inlet buffers 44, 46.

The coolant is distributed from the inlet buffers 44, 46 into the straight flow grooves 60 through 78 horizontally in the direction indicated by the arrow B. The coolant also flows through the straight flow grooves 80 through 90. Thus, the coolant is supplied to the entire power generation surface of the membrane electrode assembly 12. Then, the coolant flows through the outlet buffers 48, 50, and is discharged into the coolant discharge passage 22b through the outlet flow grooves 56, 58.

In the first embodiment, as shown in FIGS. 2 and 3, in the coolant flow field 42, the main flow field of the straight flow grooves 60 through 78 extending in the direction indicated by the arrow B has a large sectional area. The grooves of the main flow field are long at the outer positions in the vertical direction indicated by the arrow C. Specifically, among the straight flow grooves 60 through 78, the straight flow grooves 66, 68 are the shortest, and the flow grooves 60, 74 are the longest. The difference between the lengths of the flow grooves of the main flow field is considerably large. When the coolant flows from the inlet buffer 44 toward the straight flow grooves 66, 68, the coolant passes through intersection regions where the flow field resistance is large. Further, when the coolant flows from the straight flow grooves 66, 68 to the outlet buffer 48, again, the coolant passes through intersection regions. Therefore, the flow rate of the coolant is small in the straight flow grooves 66, 68. Thus, the flow rate of the coolant flowing along the straight flow grooves 66 through 78 in the direction indicated by the arrow B may not be uniform. The flow rate of the coolant flowing through the straight flow grooves 60, 74 at upper and lower opposite end positions may increase significantly.

Thus, in order to overcome the problem, in the first embodiment, the protrusions 92a, 96b for limiting the flow of the coolant are positioned on the lower sides of the inlet buffer 44 and the outlet buffer 48, respectively. Likewise, the protrusions 96a, 92b for limiting the flow of the coolant are positioned on the upper sides of inlet buffer 46 and the outlet buffer 50, respectively.

Figure 7:
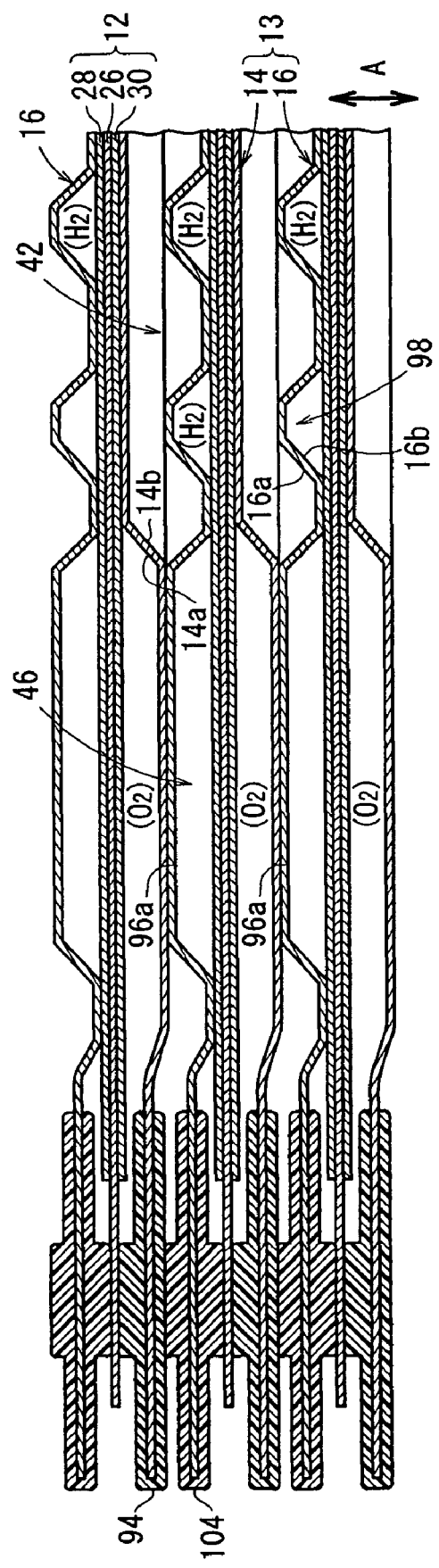
FIG. 7 is a cross sectional view showing the fuel cell taken along a line VII-VII in FIG. 3.

As shown in FIG. 6, at the inlet buffer 44, the protrusion 92a provided on the surface 14b of the first metal plate 14 contacts the surface 16a of the second metal plate 16 for limiting the flow of the coolant. As shown in FIG. 7, at the inlet buffer 46, the protrusion 96a on the second metal plate 16 contacts the surface 14b of the first metal plate 14 for limiting the flow of the coolant.

Likewise, at the outlet buffers 48, 50, the protrusion 96b of the second metal plate 16 contacts the surface 14b of the first metal plate 14, and the protrusion 92b of the first metal plate 14 contacts the surface 16a of the second metal plate 16 for limiting the flow of the coolant.

Figure 12:
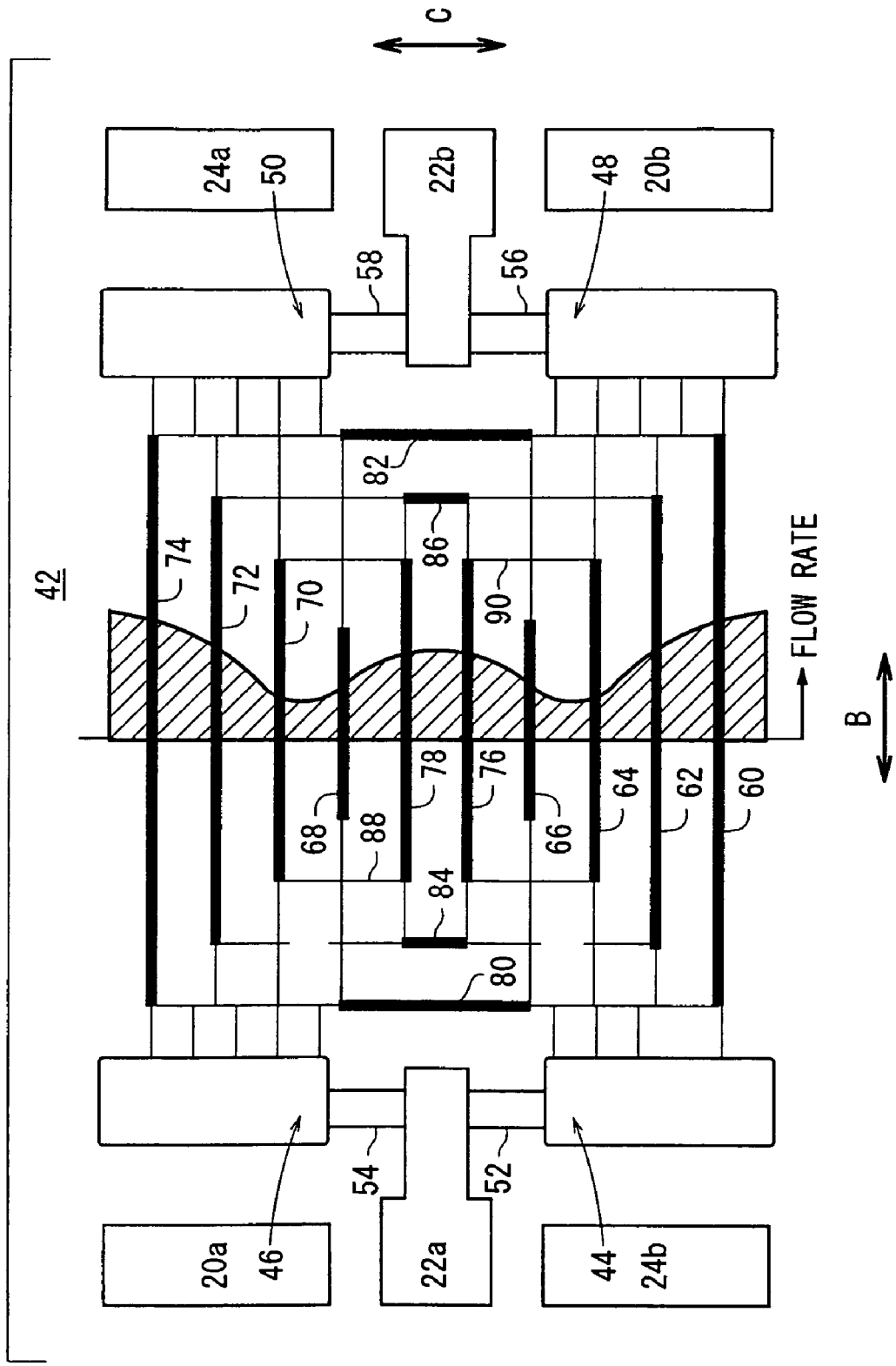
FIG. 12 is a view showing the flow rate of the coolant in a comparative example where no protrusion is provided.

Thus, the flow of the coolant is limited at opposite end positions in the direction indicated by the arrow C (at upper and lower end positions of the coolant flow field 42). Therefore, it is possible to achieve the uniform flow of the coolant in the direction indicated by the arrow B over the entire straight flow grooves 60 through 78. An experiment was performed to detect the flow rate of the coolant flowing through the coolant flow field 42 in a case where the protrusions 92a, 96a, 96b, 92b are not provided at the inlet buffers 44, 46, and the outlet buffers 48, 50. The result of the experiment is shown in FIG. 12. In FIG. 12, the flow rate of the coolant is large at the upper and lower end positions of the coolant flow field 42. Further, the flow rate of the coolant is small in the straight flow grooves 66, 68.

Figure 13:
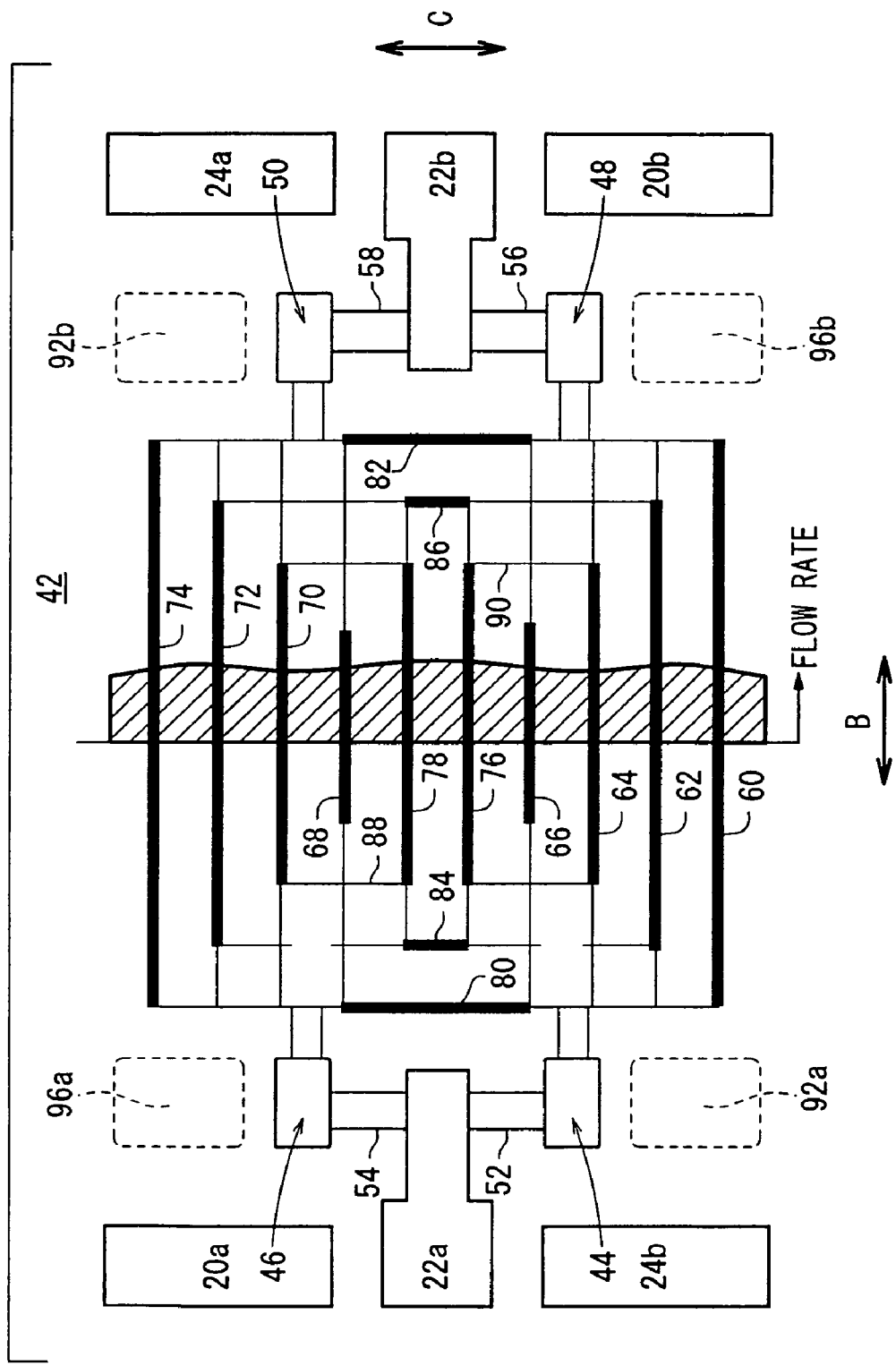
FIG. 13 is a view showing the flow rate of the coolant in the first embodiment.

In contrast, in the first embodiment, as shown in FIG. 13, since the protrusions 92a, 96a, 96b, 92b are provided on the upper and lower end positions of the coolant flow field 42, the uniform flow rate of the coolant in the direction indicated by the arrow C is achieved. Thus, in the first embodiment, with the simple structure, the coolant is uniformly and reliably supplied in the surface of the separator, and the desired power generation performance can be achieved.

Figure 14:
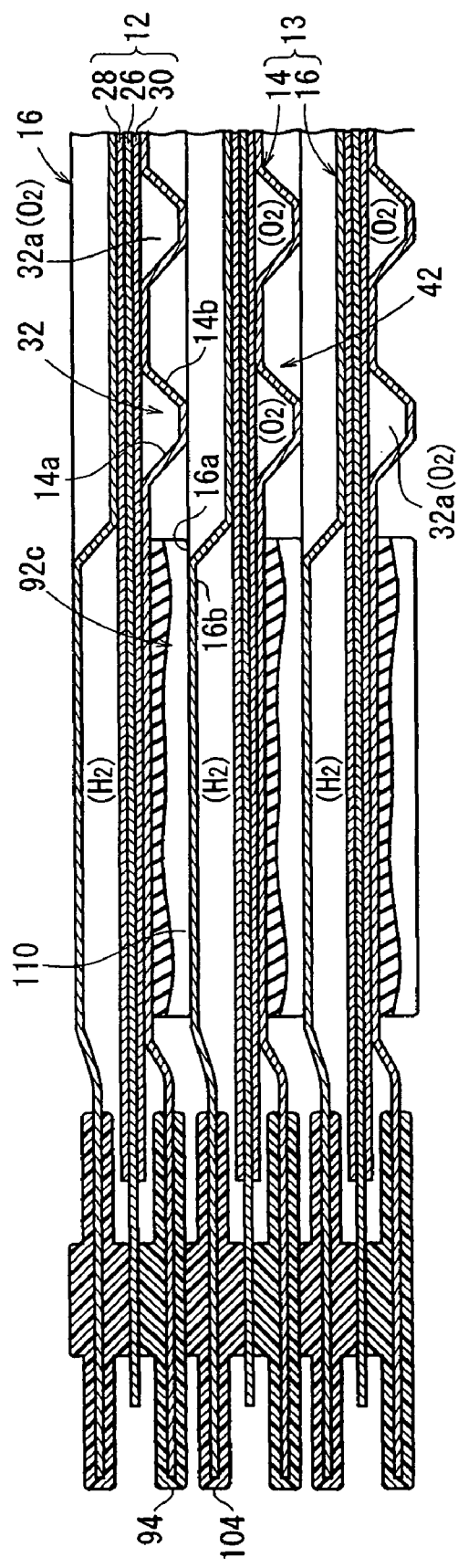
FIG. 14 is a cross sectional view showing one of protrusions of the fuel cell according to a second embodiment of the present invention.
Figure 15:
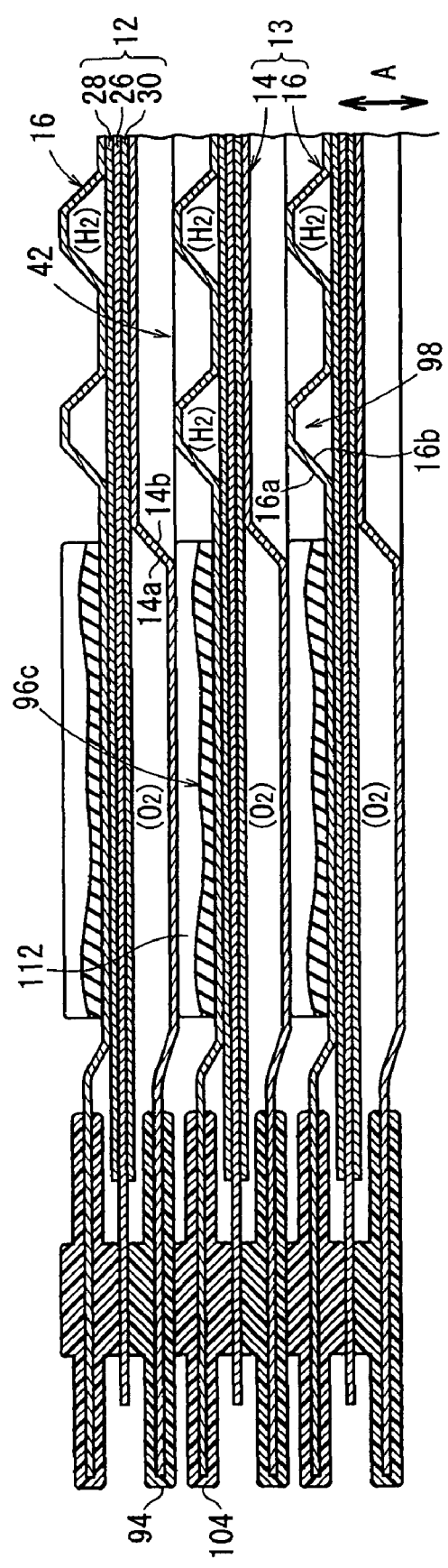
FIG. 15 is a cross sectional view showing the other of the protrusions of the fuel cell.

FIG. 14 is a cross sectional view showing a protrusion 92c of a fuel cell 10a according to a second embodiment of the present invention. FIG. 15 is a cross sectional view showing a protrusion 96c of the fuel cell 10a. The constituent elements that are identical to those of fuel cell 10 according to the first embodiment are labeled with the same reference numeral, and description thereof will be omitted. Likewise, in a third embodiment as described later, the constituent elements that are identical to those of fuel cell 10 according to the first embodiment are labeled with the same reference numeral, and description thereof will be omitted.

The protrusion 92c comprises a protrusion 110 formed on the surface 14b of the first metal plate 14. The protrusion 110 is made of rubber material, and formed integrally on the surface 14b of the first metal plate 14. The protrusion 110 contacts the surface 16a of the second metal plate 16 for limiting the flow of the coolant. Likewise, as shown in FIG. 15, the protrusion 96c comprises a protrusion 112 of rubber material formed integrally on the surface 16a of the second metal plate 16. The protrusion 112 contacts the surface 14b of the first metal plate 14 for limiting the flow of the coolant.

In the second embodiment, the protrusions 110, 112 are formed integrally on the second and first metal plates 16, 14, respectively, using rubber material. In the second embodiment, the same advantages as with the first embodiment in which the protrusions 92a, 96a are provided by pressure forming can be obtained.

Figure 16:
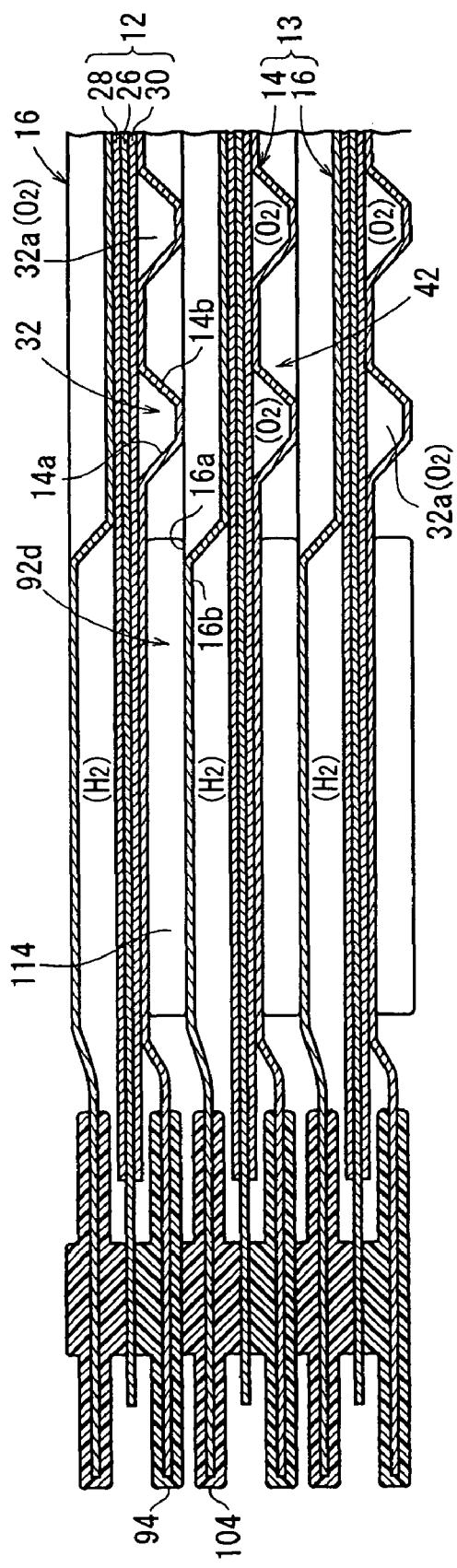
FIG. 16 is a cross sectional view showing one of protrusions of the fuel cell according to a third embodiment of the present invention.
Figure 17:
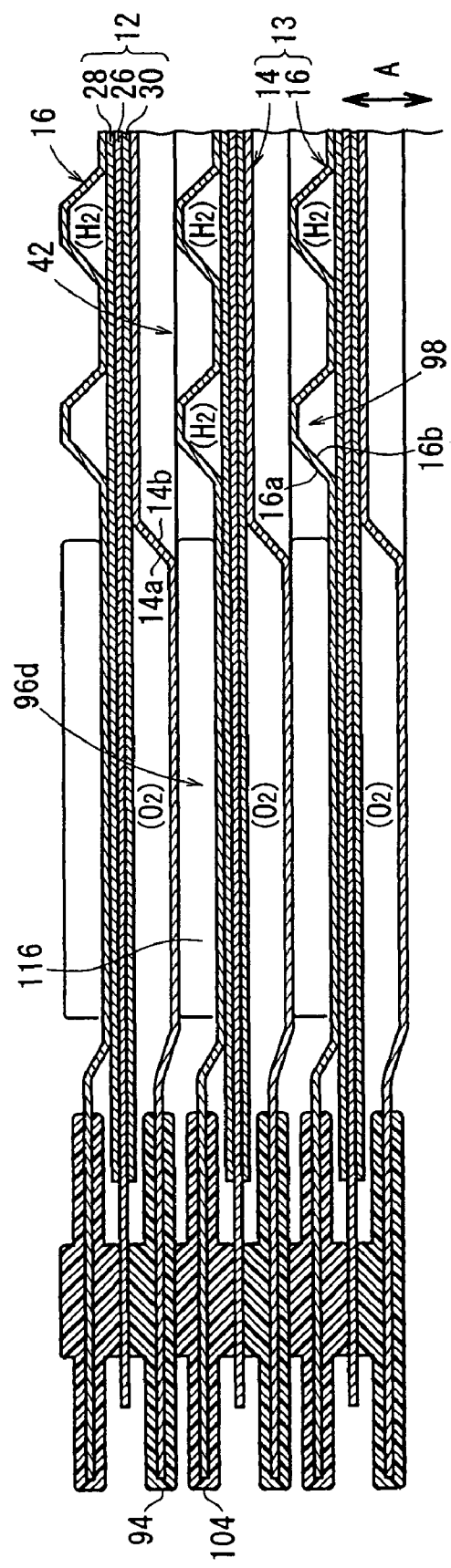
FIG. 17 is a cross sectional view showing the other of the protrusions of the fuel cell.

FIG. 16 is a cross sectional view showing a protrusion 92d of the fuel cell 10b according to a third embodiment of the present invention. FIG. 17 is a cross sectional view showing a protrusion 96d of the fuel cell 10b.

The protrusion 92d comprises a protrusion 114 made of rubber, and is formed in a predetermined shape in advance. The protrusion 114 is attached to the surface 14b of the first metal plate 14. The protrusion 114 contacts the surface 16a of the second metal plate 16. Likewise, as shown in FIG. 17, the protrusion 96d comprises a protrusion 116 made of rubber, and is formed in a predetermined shape in advance. The protrusion 116 is attached to the surface 16b of the second metal plate 16. The protrusion 116 contacts the surface 14b of the first metal plate 14. Thus, in the third embodiment, the same advantages as with the first and second embodiments can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and separators alternately in a stacking direction, said electrolyte electrode assembly including an anode and a cathode and an electrolyte interposed between said anode and said cathode,
   wherein a reactant gas passage and a coolant passage extend through said fuel cell in the stacking direction;
   each of said separators at least includes first and second metal plates stacked together;
   said first metal plate has an oxygen-containing gas flow field including a curved flow passage for supplying an oxygen-containing gas along an electrode surface of said cathode, and said second metal plate has a fuel gas flow field including a curved flow passage for supplying a fuel gas along an electrode surface of said anode;
   a coolant flow field is formed between said first and second metal plates, which directly contact each other, for supplying said coolant along surfaces of said separator;
   a plurality of grooves provided on the coolant flow field for guiding a flow of the coolant on the coolant flow field, wherein the coolant flow field defines a region that encompasses the plurality of grooves;
   at least two buffers, separate and distinct from the plurality of grooves, provided at opposite sides of the coolant passage so as to separate flow of said coolant from said coolant passage in at least two directions, and connected to said coolant passage and said coolant flow field;
   a first flow groove provided on a first side of the coolant passage, wherein the first flow groove connects the coolant passage to one of the at least two buffers;
   a second flow groove provided on a second side of the coolant passage opposed to the first side, wherein the second flow groove connects the coolant passage to another of the at least two buffers; and
   a protrusion, separate and distinct from the first flow groove and the second flow groove, is provided on a side of at least one of said buffers away from said coolant passage for limiting the flow of said coolant,
   wherein the at least two buffers, the first flow groove, the second flow groove and the protrusion are provided outside of the region defined by the coolant flow field,
   wherein among six passages comprising said fuel gas supply passage, said oxygen-containing gas supply passage, said coolant supply passage, said fuel gas discharge passage, said oxygen-containing gas discharge passage, and said coolant discharge passage, three passages extend through one end of said separators, and the other three passages extend through the other end of said separators, and
   said coolant supply passage and said coolant discharge passage are provided at middle positions of the opposite ends of said separators.

2. A fuel cell according to claim 1, wherein said reactant gas passage comprises a fuel gas supply passage, an oxygen-containing gas supply passage, a fuel gas discharge passage, and an oxygen-containing gas discharge passage;

said coolant passage comprises a coolant supply passage and a coolant discharge passage; and said buffers include at least two inlet buffers provided at opposite sides of the coolant supply passage so as to separate the flow of said coolant from said coolant supply passage in at least two directions, and connected to said coolant supply passage and said coolant flow field, and include at least two outlet buffers provided at opposite sides of the coolant discharge passage in at least two directions, and connected to said coolant flow field and said coolant discharge passage.

3. A fuel cell according to claim 2, wherein a first inlet buffer connected to said coolant supply passage and a first outlet buffer connected to said coolant discharge passage are formed on said first metal plate; and a second inlet buffer connected to said coolant supply passage and a second outlet buffer connected to said coolant discharge passage are formed on said second metal plate at positions different from positions of said first inlet buffer and said first outlet buffer.

4. A fuel cell according to claim 1, wherein said protrusion is formed integrally on said first metal plate or said second metal plate by pressure forming.

5. A fuel cell according to claim 1, wherein said protrusion is made of rubber material, and formed integrally on said first metal plate or said second metal plate.

6. A fuel cell according to claim 1, wherein said protrusion is made of rubber material, and attached to said first metal plate or said second metal plate.

7. A fuel cell formed by stacking an electrolyte electrode assembly and separators alternately in a stacking direction, said electrolyte electrode assembly including an anode and a cathode and an electrolyte interposed between said anode and said cathode, wherein a reactant gas passage and a coolant passage extend through said fuel cell in the stacking direction;

each of said separators at least includes first and second metal plates stacked together;

said first metal plate has an oxygen-containing gas flow field including a curved flow passage for supplying an oxygen-containing gas along an electrode surface of said cathode, and said second metal plate has a fuel gas flow field including a curved flow passage for supplying a fuel gas along an electrode surface of said anode;

a coolant flow field is formed between said first and second metal plates, which directly contact each other, for supplying said coolant along surfaces of said separator;

a plurality of grooves provided on the coolant flow field for guiding a flow of the coolant on the coolant flow field;

at least two buffers, separate and distinct from the plurality of grooves, provided at opposite sides of the coolant passage so as to separate flow of said coolant from said coolant passage in at least two directions, and connected to said coolant passage and said coolant flow field;

a first flow groove provided on a first side of the coolant passage, wherein the first flow groove connects the coolant passage to one of the at least two buffers, wherein the first flow groove is not in direct physical contact with the coolant flow field;

a second flow groove provided on a second side of the coolant passage opposed to the first side, wherein the second flow groove connects the coolant passage to another of the at least two buffers, wherein the second flow groove is not in direct physical contact with the coolant flow field; and a protrusion, separate and distinct from the first flow groove and the second flow groove, is provided on a side of at least one of said buffers away from said coolant passage for limiting the flow of said coolant, wherein among six passages comprising said fuel gas supply passage, said oxygen-containing gas supply passage, said coolant supply passage, said fuel gas discharge passage, said oxygen-containing gas discharge passage, and said coolant discharge passage, three passages extend through one end of said separators, and the other three passages extend through the other end of said separators, and said coolant supply passage and said coolant discharge passage are provided at middle positions of the opposite ends of said separators.

* * * * *